US008775232B2

(12) United States Patent
Chetwood et al.

(10) Patent No.: US 8,775,232 B2
(45) Date of Patent: Jul. 8, 2014

(54) TRANSFORMING A LEGACY IT INFRASTRUCTURE INTO AN ON-DEMAND OPERATING ENVIRONMENT

(75) Inventors: Mark K. Chetwood, London (GB); Martyn J. Dawkes, Caterham (GB); Christopher J. Holloway, Woking (GB); Michael O. Onoufriou, Middlesex (GB); Rashik Parmar, Leeds (GB)

(73) Assignee: International Business Machines Corporation, Armonk, NY (US)

( * ) Notice: Subject to any disclaimer, the term of this patent is extended or adjusted under 35 U.S.C. 154(b) by 2260 days.

(21) Appl. No.: 11/201,876

(22) Filed: Aug. 11, 2005

(65) Prior Publication Data

US 2007/0038648 A1 Feb. 15, 2007

(51) Int. Cl.
*G06Q 10/00* (2012.01)
*G06Q 10/06* (2012.01)

(52) U.S. Cl.
CPC .... *G06Q 10/06393* (2013.01); *G06Q 10/06395* (2013.01); *G06Q 10/063* (2013.01); *G06Q 10/0639* (2013.01); *G06Q 10/067* (2013.01)
USPC ........ 705/7.39; 705/7.11; 705/7.35; 705/7.41

(58) Field of Classification Search
CPC .............................................. G06Q 10/06393
See application file for complete search history.

(56) References Cited

U.S. PATENT DOCUMENTS

| | | | | |
|---|---|---|---|---|
| 6,424,979 | B1 * | 7/2002 | Livingston et al. | 715/206 |
| 6,427,230 | B1 * | 7/2002 | Goiffon et al. | 717/108 |
| 6,601,233 | B1 * | 7/2003 | Underwood | 717/102 |
| 6,621,505 | B1 * | 9/2003 | Beauchamp et al. | 715/764 |
| 6,640,248 | B1 * | 10/2003 | Jorgensen | 709/226 |
| 7,035,786 | B1 * | 4/2006 | Abu El Ata et al. | 703/21 |
| 7,035,809 | B2 * | 4/2006 | Miller et al. | 705/7.23 |
| 7,162,427 | B1 * | 1/2007 | Myrick et al. | 705/348 |
| 7,406,430 | B2 * | 7/2008 | Atefi et al. | 705/7.32 |
| 7,752,070 | B2 * | 7/2010 | Hatcher et al. | 705/7.38 |
| 2002/0059512 | A1 * | 5/2002 | Desjardins | 713/1 |
| 2002/0165963 | A1 * | 11/2002 | Baxley et al. | 709/226 |
| 2003/0005412 | A1 * | 1/2003 | Eanes | 717/120 |
| 2003/0033191 | A1 * | 2/2003 | Davies et al. | 705/10 |
| 2003/0046282 | A1 * | 3/2003 | Carlson et al. | 707/6 |
| 2003/0051021 | A1 * | 3/2003 | Hirschfeld et al. | 709/223 |
| 2003/0069869 | A1 * | 4/2003 | Gronau et al. | 706/46 |
| 2003/0076785 | A1 * | 4/2003 | Purpura | 370/252 |
| 2003/0110067 | A1 * | 6/2003 | Miller et al. | 705/8 |

(Continued)

OTHER PUBLICATIONS

Standard CMMI Appraisal Method for Process Improvement (SCAMPI) Version 1.1—Method Definition Document SEI Joint Program Office, Carnegie Mellon University, Dec. 2001.*

(Continued)

*Primary Examiner* — Brett Feeney
(74) *Attorney, Agent, or Firm* — Douglas A. Lashmit; Hoffman Warnick LLC

(57) ABSTRACT

A transformation engine for transforming a legacy IT infrastructure into an on-demand IT infrastructure in a financial services enterprise, the transformation engine comprising: a determiner component for determining a current status of the legacy IT infrastructure; a comparator component for comparing the determined current status to an idealised set of outcome parameters to determine a set of deviation parameters; and the determiner component determining at least one control point within the set of deviation parameters which require enterprise wide governance.

27 Claims, 9 Drawing Sheets

(56) References Cited

U.S. PATENT DOCUMENTS

| | | | |
|---|---|---|---|
| 2004/0015377 A1* | 1/2004 | Hostetler | 705/7 |
| 2004/0059611 A1* | 3/2004 | Kananghinis et al. | 705/7 |
| 2004/0093244 A1* | 5/2004 | Hatcher et al. | 705/7 |
| 2004/0098299 A1* | 5/2004 | Ligon et al. | 705/10 |
| 2004/0143470 A1* | 7/2004 | Myrick et al. | 705/7 |
| 2004/0193476 A1* | 9/2004 | Aerdts | 705/10 |
| 2004/0205206 A1* | 10/2004 | Naik et al. | 709/230 |
| 2004/0225549 A1* | 11/2004 | Parker et al. | 705/8 |
| 2004/0267601 A1* | 12/2004 | Angley | 705/10 |
| 2005/0027550 A1* | 2/2005 | Pritchard et al. | 705/1 |
| 2005/0043979 A1* | 2/2005 | Soares et al. | 705/7 |
| 2005/0091093 A1* | 4/2005 | Bhaskaran et al. | 705/7 |
| 2005/0096949 A1* | 5/2005 | Aiber et al. | 705/7 |
| 2005/0125272 A1* | 6/2005 | Hostetler | 705/7 |
| 2005/0198486 A1* | 9/2005 | Desmond et al. | 713/1 |
| 2005/0246215 A1* | 11/2005 | Rackham | 705/7 |
| 2005/0278202 A1* | 12/2005 | Broomhall et al. | 705/7 |
| 2006/0064481 A1* | 3/2006 | Baron et al. | 709/224 |
| 2006/0064485 A1* | 3/2006 | Baron et al. | 709/224 |
| 2006/0064486 A1* | 3/2006 | Baron et al. | 709/224 |
| 2006/0069540 A1* | 3/2006 | Krutz | 703/22 |
| 2006/0095309 A1* | 5/2006 | Mangan et al. | 705/8 |
| 2006/0143219 A1* | 6/2006 | Smith et al. | 707/102 |
| 2006/0224425 A1* | 10/2006 | Homann et al. | 705/7 |
| 2006/0235732 A1* | 10/2006 | Miller et al. | 705/7 |
| 2007/0100981 A1* | 5/2007 | Adamczyk et al. | 709/223 |
| 2008/0162637 A1* | 7/2008 | Adamczyk et al. | 709/204 |

OTHER PUBLICATIONS

Paulk, Mark C. et al., Capability Maturity Model for Software Version 1.1 Carnegie Mellon University, Technical Report CMU/SEI-93-TR-024, Feb. 1993.*
Organizational Project Management Maturity Model—OPM3 Project Management Institute, 2003.*
Ward J (1995). Strategic Planning for Information Systems. Wiley Publishing. 1-134.*
Systems Security Engineering Capability Maturity Model—Model & Appraisal Method Apr. 1999.*
Mathias, Ekstedt et al., An Organization Wide Approach for Assessing Strategic Business and IT Alignment PICMET 2005.*
Prosci's Change Management Maturity Model Prosci, 2004.*
Banker RD and Kauffman RJ (1991). Reuse and Productivity in Integrated Computer-Aided Software Engineering: An Empirical Study. MIS Quarterly. 14(3): 374-401.*

* cited by examiner

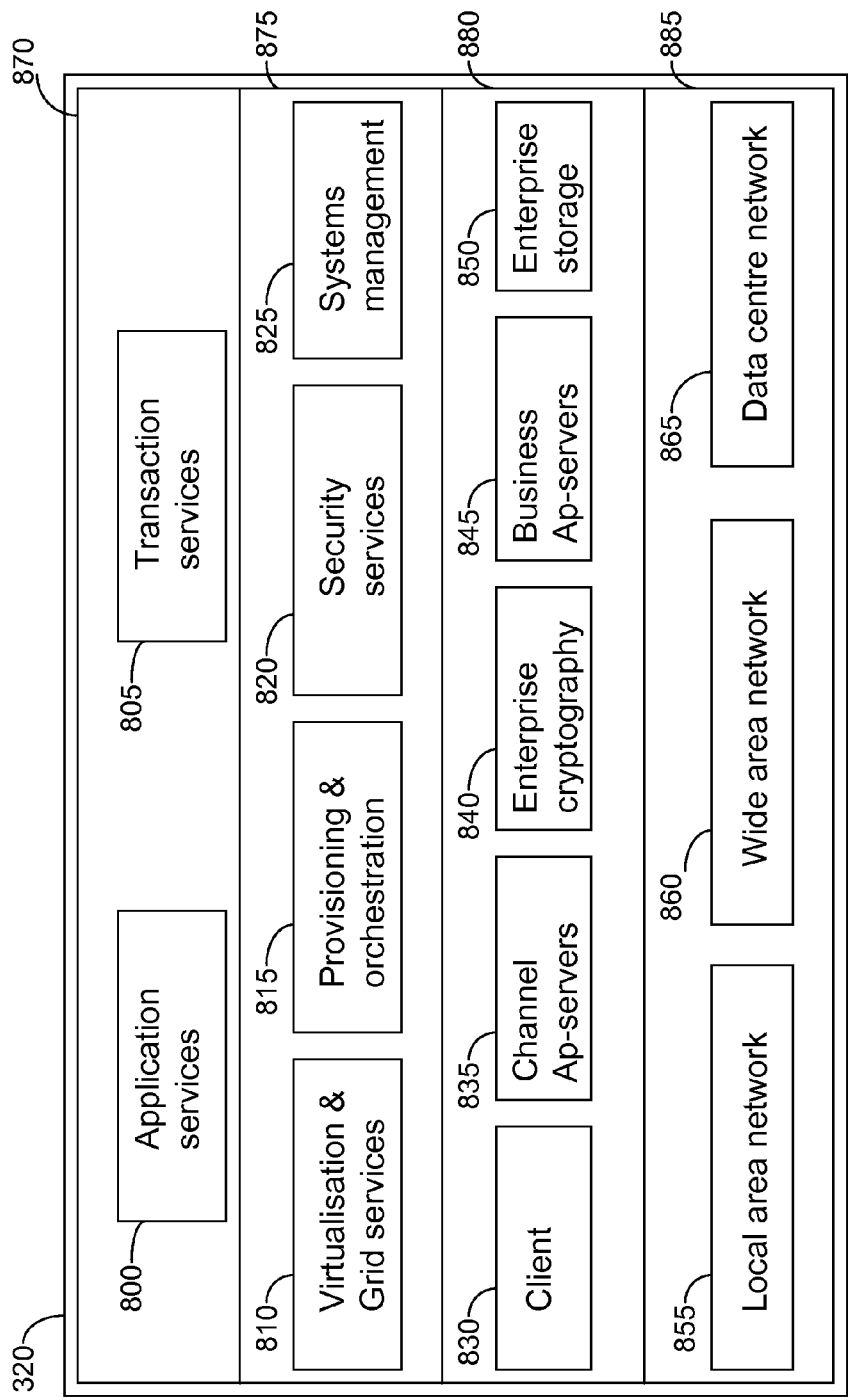

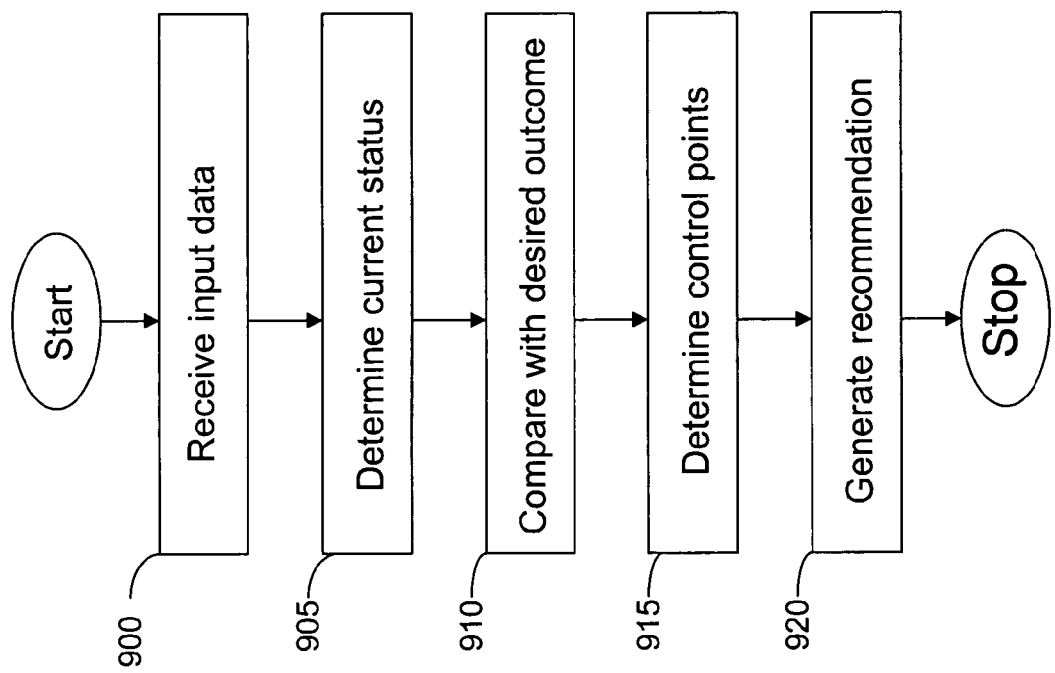

TRANSFORMING A LEGACY IT INFRASTRUCTURE INTO AN ON-DEMAND OPERATING ENVIRONMENT

FIELD OF THE INVENTION

The invention relates to the field of architectural modelling methods and tools. In particular the invention relates to a transformation engine for transforming a legacy information technology (IT) infrastructure into an on-demand operating environment.

BACKGROUND OF THE INVENTION

In the last few years an economic downturn has created a major focus on cost cutting and efficiency initiatives across many types of industries. One of the greatest impacts of the economic downturn, in the years 2002 to 2003, has been seen within the financial services sector which has seen an increase in governmental regulation and a demand for greater transparency in financial reporting, accounting and risk management.

In response to cost cutting Chief Information Officers (CIO's) have sought to simplify and consolidate their financial services infrastructure. This has been achieved by replacing current IT infrastructure with new products and services and/or finding opportunities for out-sourcing and off-shoring their service and infrastructure support. Whilst this approach may have delivered short term benefits, the technical infrastructure which is left under the financial enterprises control is ill-equipped to meet the demands of industry growth. To meet these demands requires the financial enterprises to respond more rapidly to new market opportunities, economic changes and competitive threats. The complexity of IT infrastructure and applications which support the financial enterprises often inhibit the ability to respond rapidly while containing cost and to deliver greater transparency.

Previous industry growth was achieved by rapid geographic expansion and mergers, both of which have left a legacy of increased complexity at a business level, an application level and a technical level. With a few notable exceptions, what has emerged is a significant duplication and redundancy at each of the above levels. This additional complexity has made it increasingly difficult to achieve many of the goals of cost cutting and the delivery of transparency mandated by many regulatory requirements. Thus many financial service enterprises are left with trying to achieve organic growth and to operate an efficient and secure business on what has become a chaotic development and operational infrastructure. For example, it is not unusual for the average utilisation of servers in a server farm to be between five percent and fifteen percent level of utilisation. This is a result of the servers being dedicated to particular applications, rather than providing a set of services that may be shared across multiple applications.

The IT and application infrastructure is slowly becoming no longer fit for the purpose that the business is beginning to demand for it. The rate of technology change is increasing and along with it there is an increase in the speed of take up of new technology. This is contributing to an unwieldy IT infrastructure and is not attuned to rapid change at the technology level or at the application level. In fact, some financial enterprises can now take longer to deploy a new software product release than the maintenance lifecycle of the product itself, leading to increased operational risk. Further, it can also take longer to develop and deploy a new financial product than the time the window of opportunity for that product remains open.

It has now become apparent that current technology models can no loner sustain the increasing rate and pace of change that is demanded of them by the business. Hence there is a need within the art for a new technology model that is able to reach higher levels of utilisation and application sharing, and to rapidly absorb a number of changing technical and business factors and parameters and thus evolve with the ever changing business environment.

SUMMARY OF THE INVENTION

Viewed from a first aspect the present invention provides a transformation engine for transforming a legacy IT infrastructure into an on-demand IT infrastructure in a financial services enterprise, the transformation engine comprising: a determiner component for determining a current status of the legacy IT infrastructure; a comparator component for comparing the determined current status to an idealised set of outcome parameters to determine a set of deviation parameters; and the determiner component determining at least one control point within the set of deviation parameters which require enterprise wide governance.

The invention advantageously provides a transformation engine, a method and an architectural model for transformation a legacy IT infrastructure into an on-demand operating model. The invention allows enterprises to concentrate on the technical aspect of their IT infrastructure that require change in order to successfully transform the legacy IT infrastructure. A number of control points are identified that provide this focus. The control points provide an architectural blue print for an on-demand environment detailing the architecture that is required.

Preferably the present invention provides a transformation engine for monitoring the level of adoption of the at least one control point in the on-demand operating infrastructure.

Preferably the present invention provides a transformation engine wherein the determiner component further comprises a parsing component for parsing a set of input data and for categorising the input data into enterprise domains in order to apply a rule set specific to each of the enterprise domains.

Preferably the present invention provides a transformation engine wherein the rule set determines the current status of the IT infrastructure for each enterprise domain.

Preferably the present invention provides a transformation engine wherein each control point indicates what IT infrastructure capability is critical to achieving an on-demand infrastructure.

Preferably the present invention provides a transformation engine wherein the IT infrastructure capability is comprised of user IT infrastructure, process IT infrastructure, development IT infrastructure, information IT infrastructure and management IT infrastructure.

Preferably the present invention provides a transformation engine wherein a control point further comprises sub control points.

Preferably the present invention provides a transformation engine wherein each control point details a set of operations to be performed.

Preferably the present invention provides a transformation engine further comprising a storing component for building an enterprise specific taxonomy categorised by enterprise domains.

Preferably the present invention provides a transformation engine wherein the control points provide an architectural model for an on-demand operating environment.

Viewed from a second aspect the present invention provides a method for transforming a legacy IT infrastructure into an on-demand IT infrastructure, the method comprising: determining a current status of the legacy infrastructure; comparing the determined current status to an idealised set of outcome parameters to determine a set of deviation parameters; and determining at least one control point within the set of deviation parameters which require enterprise wide governance.

Viewed from a third aspect the present invention provides a computer program product loadable into the internal memory of a digital computer, comprising software code portions for performing, when said product is run on a computer, to carry out the invention as described above.

BRIEF DESCRIPTION OF THE DRAWINGS

Embodiments of the invention are described below in detail, by way of example only, with reference to the accompanying drawings in which:

FIG. 8 shows a block diagram of the control points of the enterprise infrastructure management domain in accordance with an illustrative embodiment of the present invention; and FIG. 9 shows a flow chart detailing the operational steps of the transformation engine in accordance with an illustrative embodiment of the invention.

DETAILED DESCRIPTION OF THE INVENTION

Figure 1:
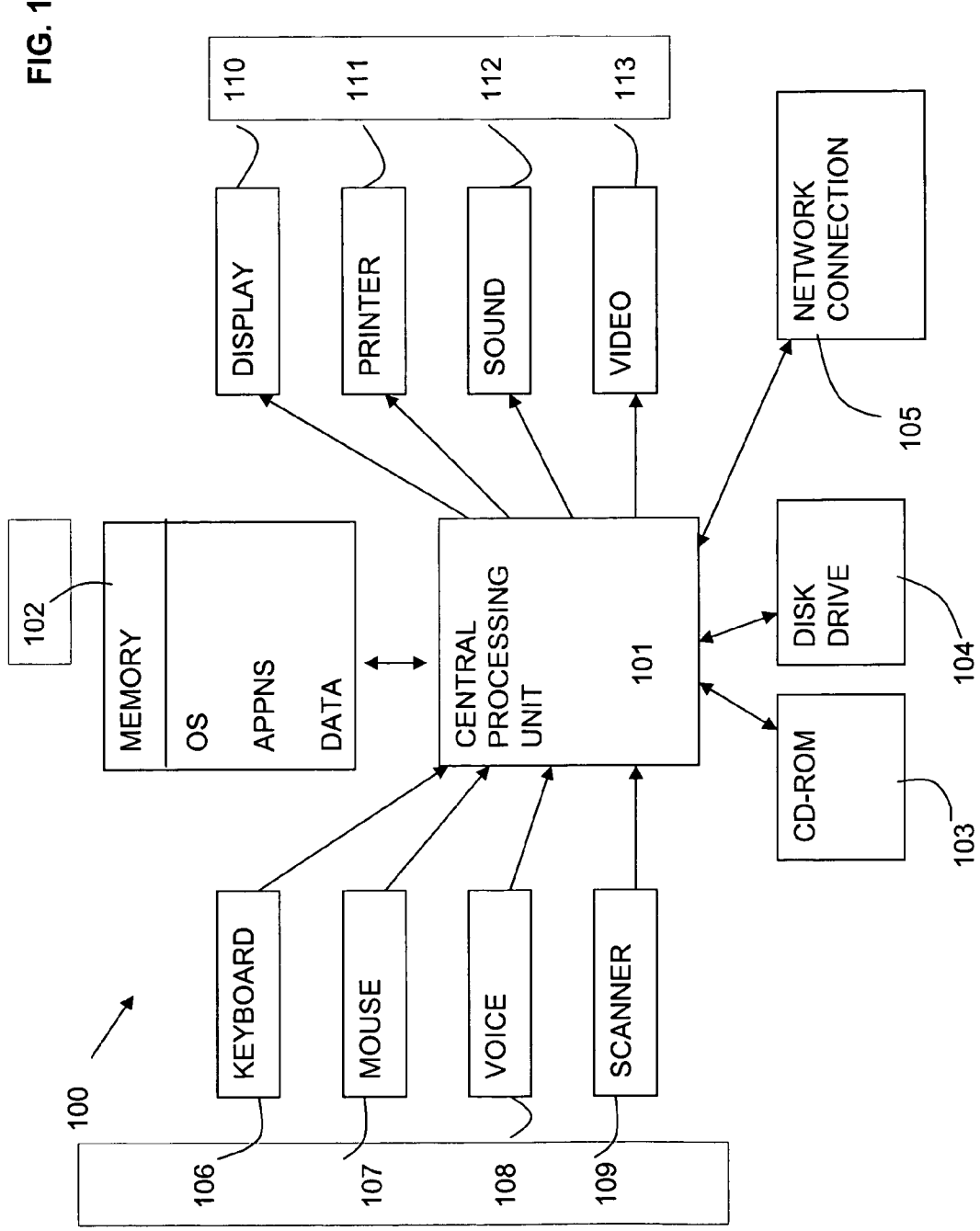
FIG. 1 is a schematic block diagram showing a computer system in accordance with an illustrative embodiment of the present invention.

Referring to FIG. 1, a computer system 100 is shown in which an illustrative embodiment of the present invention may be implemented. A computer system 100 has a central processing unit 101 with primary storage in the form of memory 102 (RAM and ROM). The memory 102 stores program information and data acted on or created by the programs. The program information comprises the operating system code for the computer system 100 and application code for applications running on the computer system 100. Secondary storage comprises optical disk storage 103 and magnetic disk storage 104. Data and program information can also be stored and accessed from the secondary storage.

The computer system 100 comprises a network connection means 105 for interfacing the computer system 100 to a network such as a local area network (LAN) or the Internet. The computer system 100 may also have other external source communication means such as a fax modem or telephone connection.

The central processing unit 101 comprises inputs in the form of, as examples, a keyboard 106, a mouse 107, voice input 108, and a scanner 109 for inputting text, images, graphics or the like. Outputs from the central processing unit 100 may include a display means 110, a printer 111, sound output 112, video output 113, etc.

In a distributed system, a computer system 100 as shown in FIG. 1 may be connected via a network connection 105 to a server on which applications may be run remotely from the central processing unit 101 which is then referred to as a client system. The server may also provide secondary storage of data which is accessible to the processing unit.

Applications may run on the computer systems 100 from a storage means or via a network connection which may include spread sheet applications, database applications and other storage and retrieval mechanisms.

Figure 2:
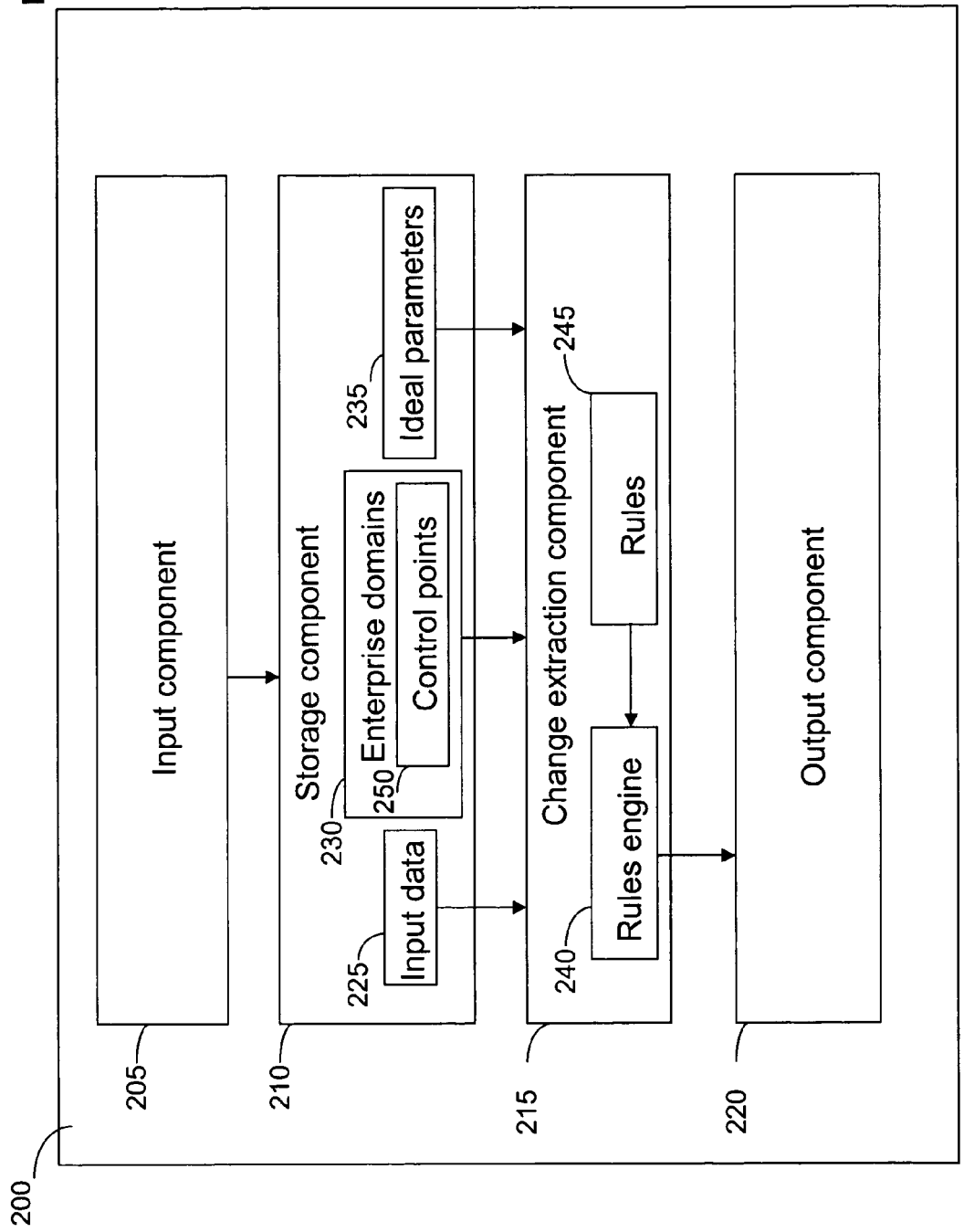
FIG. 2 is a schematic block diagram showing the components of the transformation engine in accordance with an illustrative embodiment of the present invention.
Figure 3:
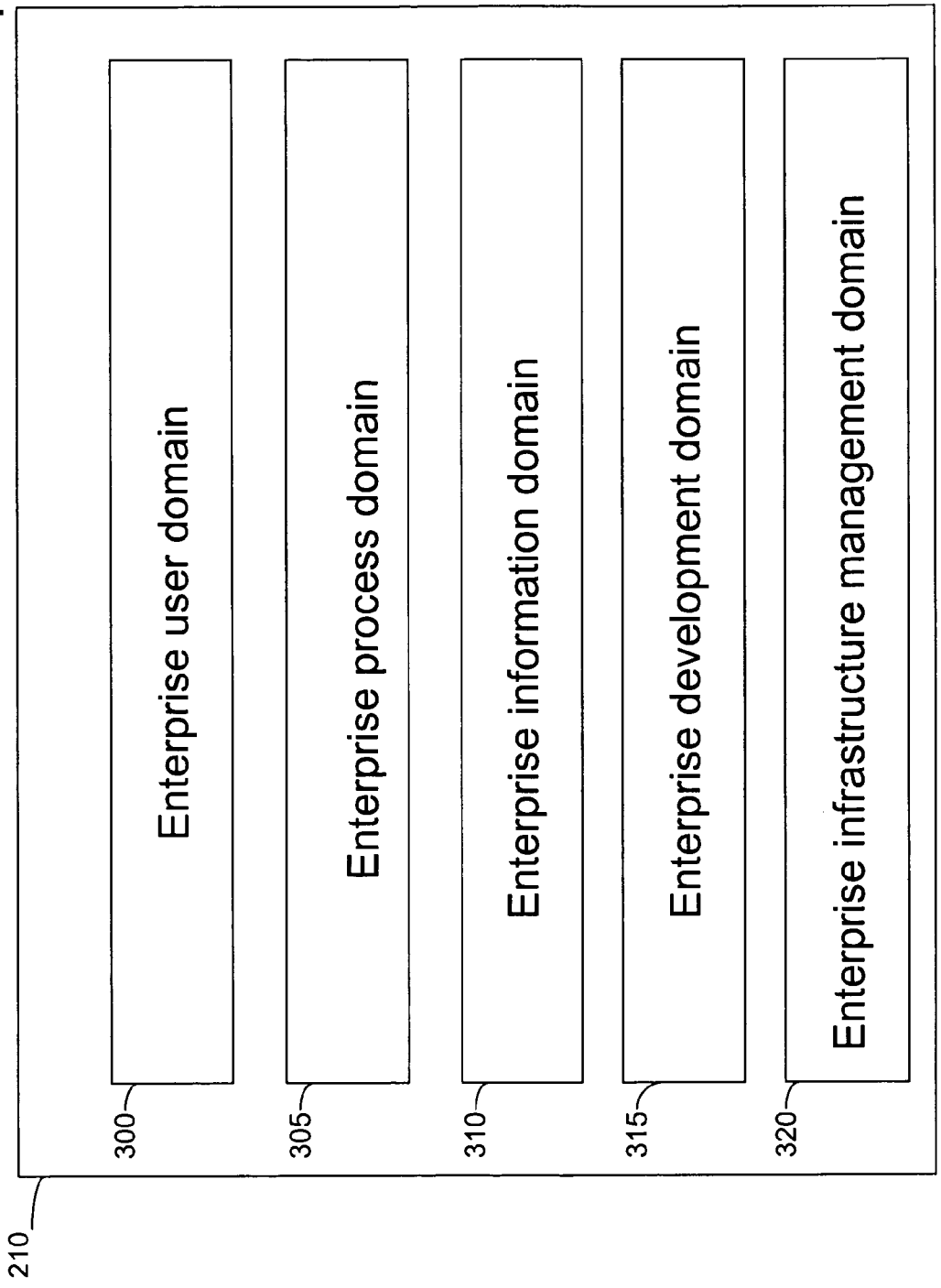
FIG. 3 shows the enterprise domains in accordance with an illustrative embodiment of the present invention.

FIG. 2 shows the components of an illustrative embodiment of the present invention. The present invention provides an enhancement to current methodology and modelling tools in the form of a transformation engine 200 suitable for the financial services sector, but equally the transformation engine 200 may be used in any environment when an on-demand IT operating model needs to be adopted. The transformation engine 200 identifies the critical technical control points within the IT infrastructure that require enterprise wide governance from the parts of the IT infrastructure that do not. For example, when rendering a user interface, printers are not a control point while portal services are etc. Further the transformation engine 200 also identifies specific industry needs which are not generic to most industries, for example external gateway services and financial networks are characteristically different than typical B2B gateways and hence require different treatment.

The transformation engine 200 may be installed on the computer system 100 as a stand-alone application or as an add-on to existing modelling tools. The transformation engine 200 comprises a number of components that operate and interface with each other in order to analyse input data and to determine, via a set of control points, which aspects of the enterprise's IT infrastructure need to be modified, replaced or updated to achieve enterprise wide governance. In order to achieve this the transformation engine 200 comprises a number of sub-components namely: an input component 205 for receiving input from an external source; a storage component 210 for storing the input data, an idealised set of input parameters 235 representing the optimum on-demand operating environment for a specific enterprise and the enterprise domains 230 and their control points 250; a change extraction component 215 for determining the current status of the enterprise's IT infrastructure, comparing the idealised parameters to the current status to determine any deviations within the transformation process and to map the deviations to the control points to determine which deviations require enterprise wide governance; and an output component 220 for outputting a list of control points that require attention.

The input component 205 provides a graphical user interface for inputting data into data input fields. Input data may be received via manual input of the data by a user or via a data feed from an external source. The data input fields are categorised into enterprise domains. For example, an enterprise user domain, an enterprise process domain, an enterprise information domain, an enterprise development domain and an enterprise infrastructure management domain. For each enterprise domain a series of questions are displayed by the input component 205. Each question relates to an area of the enterprise that requires enterprise wide governance in order to build an on-demand environment. For example, a question in the enterprise user domain may be concerned with whether the enterprise has any web client installed and what hardware and software the web client has installed. Equally, a question in the enterprise process domain may ask for data concerning business process services etc. The input component 205 on receiving the input data transmits the input data to the storage component 210.

The storage component 210 interfaces with a storage medium 103, 104 for the storing of data. The storage component 210 stores the input data received from the input component 205, a set of control points 250 and a set of idealised parameters 235. The set of idealised parameters 235 are enterprise and domain specific, i.e. one set of idealised parameters 235 for the insurance industry and another set of idealised parameters 235 for the banking industry etc. The different sets of idealised parameters 235 reflect the different technical needs of various industries' etc. The storage component 210 also stores the current status of the enterprise's IT infrastructure when received from the change extraction component 215. The storage component 210 also stores a set of control points 250. Each control point 250 is associated with an enterprise domain 230. Each control point 250 signifies an area of importance within each of the enterprise domains 230. A control point 250 acts as a checkpoint within the transformation process. Each control point 250 details what IT infrastructure capability is critical to achieving an on-demand infrastructure and hence should be planned to be in operation within the enterprise or should already be in operation within the enterprise. As the transformation engine 200 processes the various sets of data, the storage component 210 builds an enterprise specific taxonomy providing ease of access to the data.

The change extraction component 215 comprises a rules engine 240 and a set of rules 245. The rules engine 240 parses the set of rules 245 in order to determine the current status of the enterprises IT infrastructure and any deviation parameters between the current status and the idealised parameters. If any deviations are detected, the rules engine 240 maps the deviations to the control points 250 to determine which deviations require attention in order to complete the transformation process.

Rules 245 may also be applied to the input data to determine the level of adoption of an on-demand operating environment as an enterprise progresses through the transformation process.

The output component 220 displays the output from the rules engine 240. The output may comprise a report detailing the areas of the enterprise's IT infrastructure which require attention and a progress report detailing the transformation progress to date. Alternatively, the output component 220 interfaces with a query tool for building different types of reports.

As previously explained the rules engine 240 requests from the storage component 210 a number of input parameters, namely, the current status of the IT infrastructure, the idealised parameters 235 and the control points 250. The control points 250 are instrumental in determining which areas of an IT infrastructure require enterprise wide governance in order to achieve an on-demand infrastructure. Each control point 250 provides instruction as to what level of implementation is required. A control point 250 may have a sub control point. Each of the control points 250 and their associated enterprise domain 230 combine to form an architectural model for building an on-demand operating environment. The control points 250 and enterprise domains 230 act as a map as to what technical elements need to be in place in order to transform a legacy IT infrastructure into an on-demand operating environment. The architectural model which underpins the transformation engine 200 will now be explained.

Figure 4:
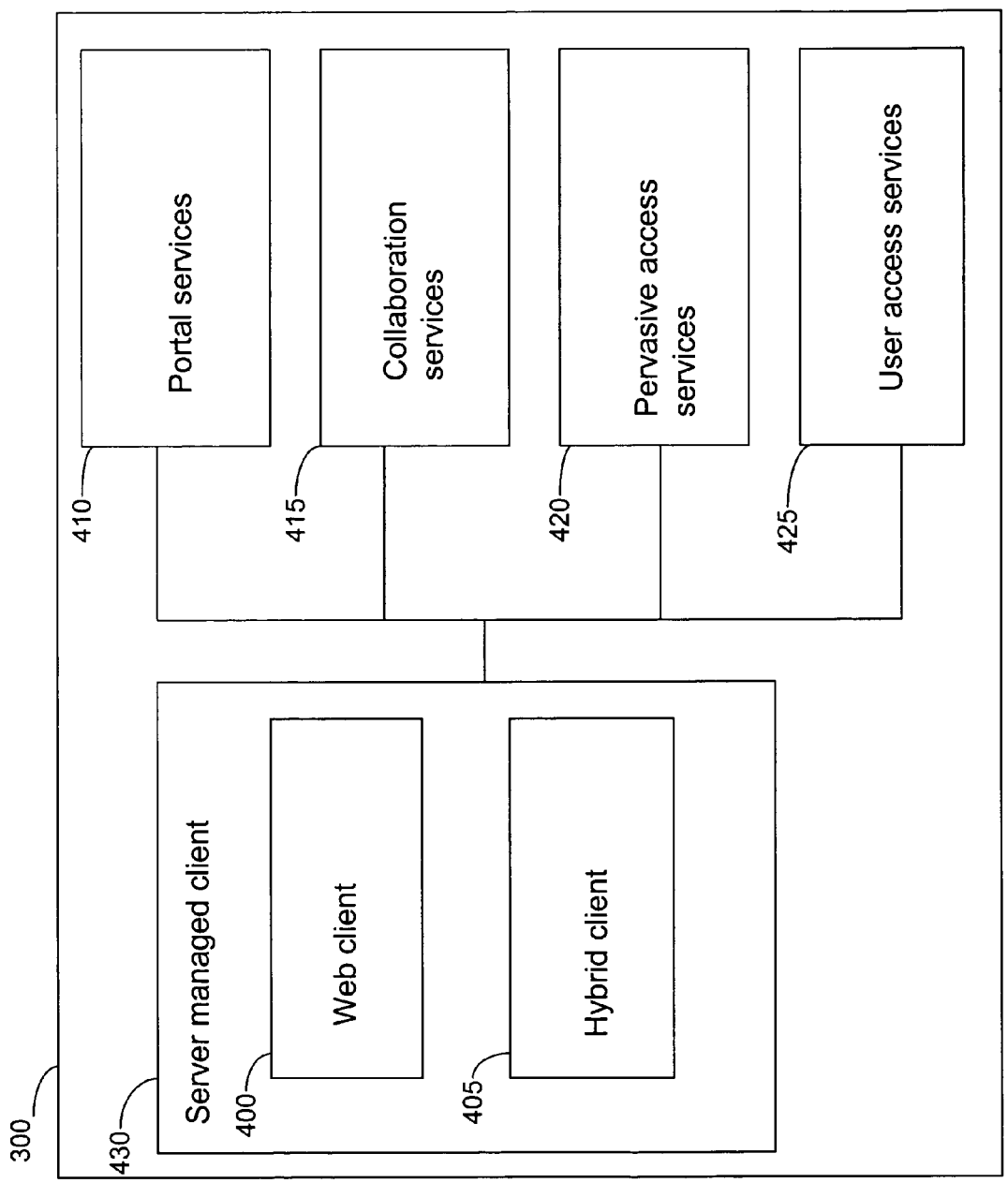
FIG. 4 shows a block diagram of the control points of the enterprise user domain in accordance with an illustrative embodiment of the present invention.

Referring to FIG. 4, the enterprise domains 230 are shown. The data store comprises five enterprise domains 230, namely, an enterprise user domain 300, an enterprise process domain 305, an enterprise information domain 310, an enterprise development domain 315 and an enterprise infrastructure management domain 320. Each of these enterprise domains 230 can be populated with input data independently (from the input component 205) but interact with each other to provide a map for the current state of an enterprise's legacy infrastructure.

Each enterprise domain 230 is concerned with a discrete technical area of the enterprise's IT infrastructure. For example, the enterprise user domain 300 is concerned with identifying and modelling the necessary access points with regards to IT systems, the user computing facilities that need to be shared, and determining that access can be gained to these systems when access is required, by the appropriate people and at the requested time.

FIG. 4 shows the control points 250 of the enterprise user domain 300 in further detail. The enterprise user domain 300 is classified into a number of control points, namely portal services 410, collaboration services 415, pervasive access services 420 and user access services 425, which are considered key control points. For each enterprise the above control points are identified and the technology that is currently implementing each of the control points 410, 415, 420, 425 is stored in the data store 103, 104. It is important to understand that most enterprises are not starting with 'nothing' but in fact have a rich and diverse set of technologies that are already implemented thus it is important to identify what technology is already implemented, what technology is required to fill a function and what is already implemented that is not required.

A portal service 410 is considered as a control point because portal services provide the means of bringing together content from a wide range of sources to the user's desktop. The access to content is provided by portlets and allows user to personalise their user settings and indicate which portlet page's the user would like displayed in their portal view.

Collaboration services 415 are another control point. Collaboration services comprise components needed to enable the user to share information with other users. Examples of these services include email, real-time chat and shared folders or repositories. Pervasive access services 420 allow a wide range of pervasive devices to access the enterprise systems in such a way that the business application can develop awareness of the location of user, and user access services 425 provide the facilities to control access to the systems, applications, information and also the management services of the supporting infrastructure.

Further control points describe the entry points for users to access the system. For example, in order to access a portal service a user may access the portal service via a server managed client 430. A server managed client 430 is the primary interface between the user and the systems and services the user may access. The rapid change in client technologies and the growth in volume of client devices together make it essential to ensure that these devices can be managed centrally by a server. The capability of client devices to be consistently server managed is therefore a control point in the IT infrastructure.

There are two types of server managed clients 430 exemplified which are of themselves control points, a web client 400 and a hybrid client 405. The web client is characterised as being dependent on the network and the supporting application services to provide a particular function. The hybrid client is characterised as being in addition capable of operating as a standalone personal computer providing a similar range of function when disconnected from the network, and which as such has much of the functionality that is required installed on its own hardware.

Both the web client 400 and the hybrid client 405 may be categorised into 3 layers, for example, the application, the operating system and the hardware layer. Each layer represents a set of applications that operate in that layer. The web client application layer may only be responsible for providing user interface aspect of the applications. The hybrid client 405 additionally supports a set of rich client applications that can share processes and information.

The operating system layer provides a range of services to both abstract the hardware from the application layer and manage the hardware. Workstation management provides the capabilities needed to be a server managed client. Security services provide interfaces to any local security hardware, and support services for a browser, JVM, and imbedded applications.

Figure 5:
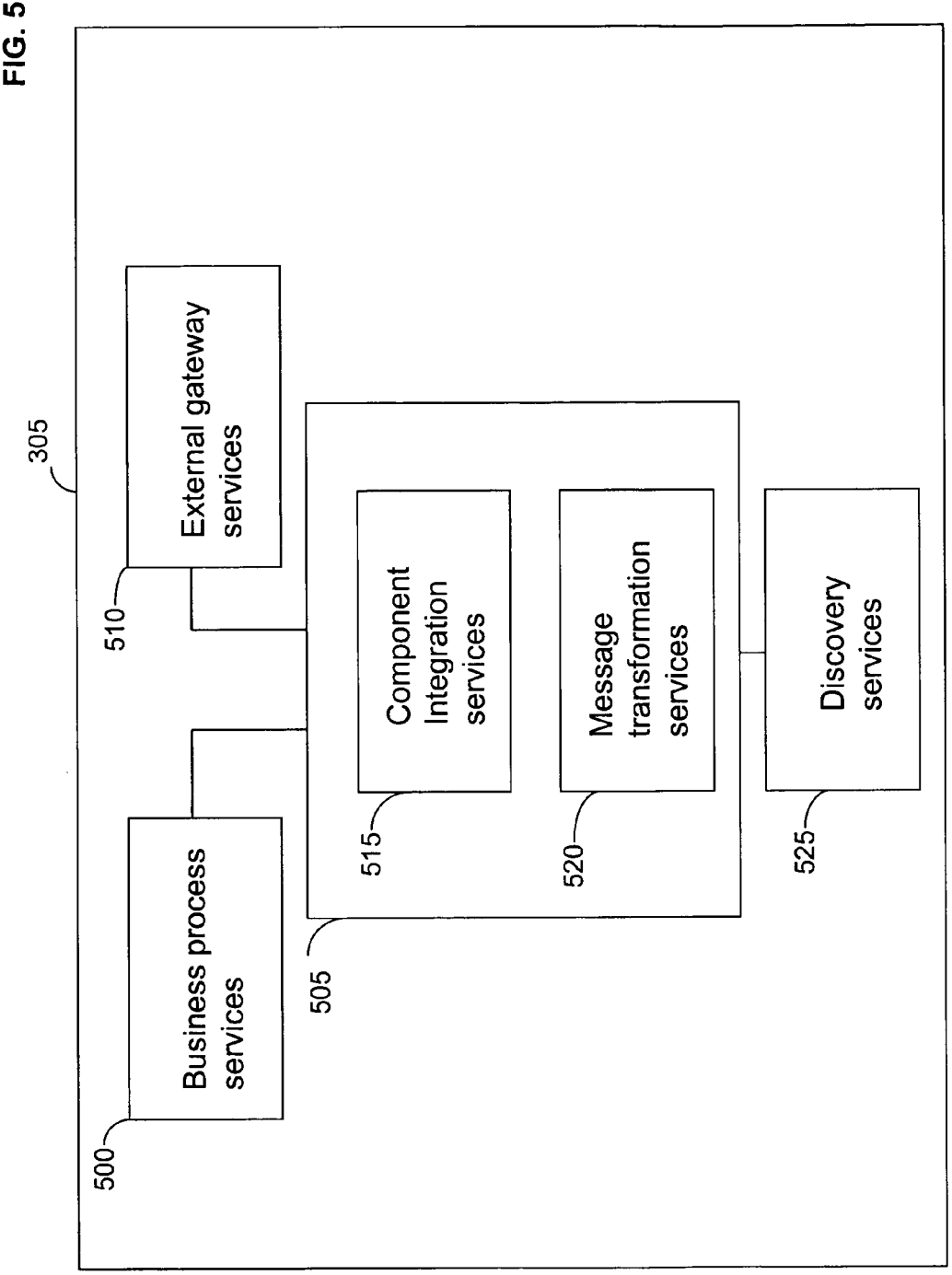
FIG. 5 shows a block diagram of the control points of the enterprise process domain in accordance with an illustrative embodiment of the present invention.

FIG. 5 shows the enterprise process domain 305. The enterprise process domain 305 addresses the issues and challenges in the infrastructure that result from the enterprises desires to enable business transformation, adhere to regulatory requirements and compliance, enable business process outsourcing and allow the integration or separation of acquired or divested businesses. The enterprise process domain 305 comprises the following control points, business process services 500, external gateway services 510, component integration services 515, message transformation services 520 and discovery services 525.

The business process service control point 500 identifies and provides for the separation of process and implementation of a process engine to allow changing of a process without a major application rewrite. The business process service 500 provides the capability to exploit the process models created during the analysis and design phase by translating the models into a business process execution language and providing a choreography engine to manage the implementation.

The external gateway services control point 510 provides the ability to integrate processes across different technology models through the alignment of web services standards. External gateway services 510 also include the ability to expose only those components that partners and customers are authorised to access.

The discovery services control point 525 is able to discover and connect business function services at runtime. Service discovery is applicable to both internal and external services. Discovery services requirement are based on a discovery agency offering a common repository to which service providers publish their service information to the discovery service.

The component integration services control point 515 enables integration of multiple application components in to a single business function. This also includes the ability through API's to call many disparate applications that execute on various technologies. The message transformation services control point 520 provides connection capabilities, message mediation, intelligent routing, message content transformation and enrichment, logging and guaranteed message delivery etc.

Figure 6:
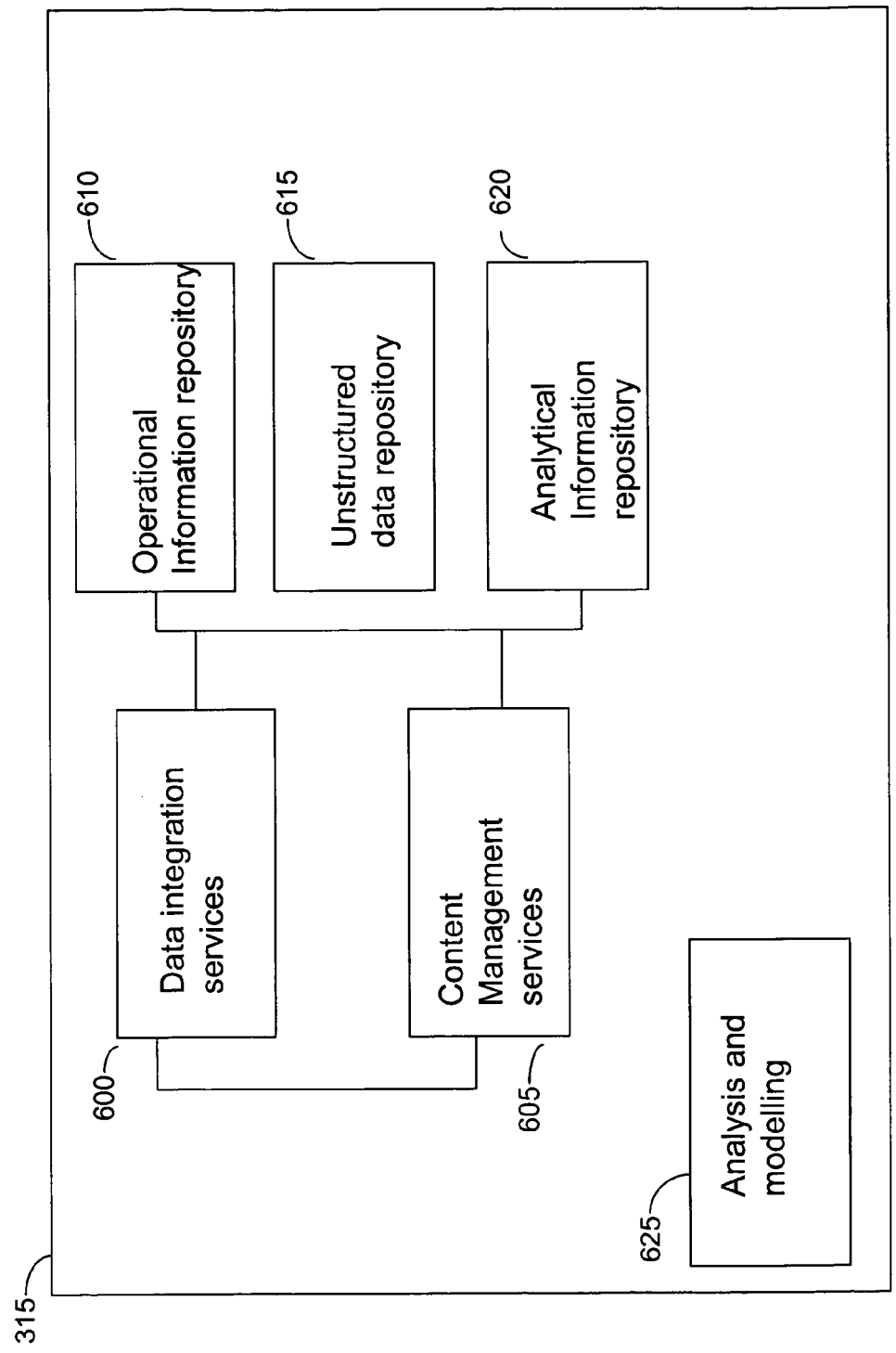
FIG. 6 shows a block diagram of the control points of the enterprise information domain in accordance with an illustrative embodiment of the present invention.

FIG. 6 illustrates the enterprise information domain 310. The enterprise information domain 310 is concerned with ensuring access by applications to relevant information of any type when it is needed. The information is an intelligent assimilation and rendering of data typically of various types from multiple sources. The enterprise information domain comprises the following control points, namely, data integration services 600, content management services 605, operational information repository 610, unstructured data repository 615, analytical information repository 620 and analysis and modelling.

The enterprise business applications are both the source and the sink of the data. They produce and consume information that is the concern of the enterprise information domain. The actual storage of the information is the domain of the different repositories.

The business applications access and store data through one of the data management services: data integration services 600, or content management services 605. Data integration services provides coherent and consistent access to semantically structured data from a variety of internal and external sources which may be managed by different database management systems or stored in different types of repository, to provide an integrated view of any defined entity; they also provide for consistent update of information across a set of repositories under a single instruction from the application, directed by rules or policies. Content management services 605 provide for the management of meta-data that describes unstructured data content such as photographs, voice, video etc; and for the management of storage and retrieval of the content that belongs to that meta-data The analysis and modelling control point 625 is concerned with the build and run-time metadata and their representation. Meta-data is data that categorises, describes and provides control information about the data itself. It is vital that the enterprise information domain is built on a consistent set of design time metadata which in turn feeds and updates the necessary runtime data.

The unstructured data repository control point 615 quickly captures and manages a range of data assets that have little or no internal semantic structure, including for example documents, emails, photos, images etc. It stores, archives, searches, retrieves and delivers unstructured data. Further the unstructured data repository provides the ability to support potentially many different legacy content management applications.

The operational information repository 610 stores semantically structured data, for example database records, meta-data records etc, which are required to be maintained current, and may be retrieved and updated on an individual record basis. It also provides for the referential integrity of any given store of such information which is under the management of a single database management system. It is the normal form of information storage for systems of record supporting core business applications and transactional systems.

The analytical information repository 620 stores semantically structured data that are not maintained current, but represent an historical record of activity, or a moment in time view across a large number of records. This repository enables an analysis to be performed across a set of information that remains coherent and consistent during the course of the analysis. The entire repository may be updated at regular intervals to create a new point in time position.

Figure 7:
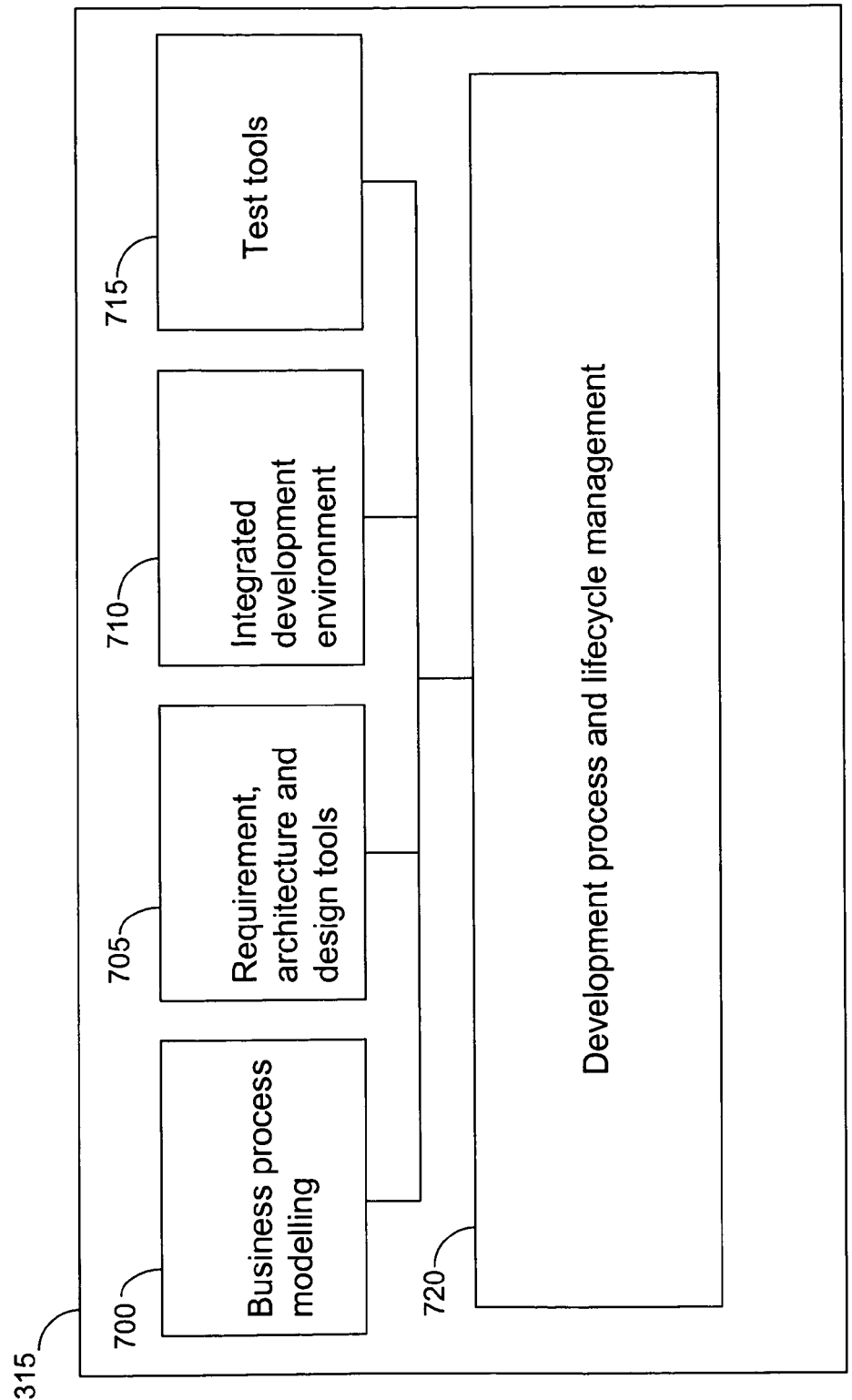
FIG. 7 shows a block diagram of the control points of enterprise development domain in accordance with an illustrative embodiment of the present invention.

Moving onto FIG. 7 the enterprise development domain 315 and its critical control points are shown. The enterprise development domain 315 is concerned with identifying, developing, integrating, testing and managing software assets and ensuring that all available software assets are exploited where appropriate. For example, applications that are identified as operating in one particular department and which are not considered specialist software would be made available for use by and integration into the processes of another department, thereby reducing duplication.

The enterprise development domain 315 comprises the following control points: a business process modelling control point 700, a requirement, architecture and design tools control point 705, an integrated development environment control point 710, a test tool control point 715 and a development process and lifecycle management control point 720.

The business modelling control point 700 is concerned with business process modelling in which various aspects should be considered. For example: modelling to understand and aligning process in different parts of the enterprise, identifying key areas of concern in the enterprise across strategy, business and IT and prioritising investments; process simulation and building process monitoring capability in order to continuously improve performance and process definition; and process modelling with the purpose of understanding how to best architect and build application support for the organisation.

The requirements, architecture and design tools control point 705 identifies tools which address consistency and control across requirements, architecture and design phases of development.

The integrated development environment control point 710 addresses the issues of moving to a model driven development approach in which the integrated development environment must be able to relate to the other types of models so that the function being developed can be seen in the context of the overall scope of the models, applications may be assembled from components originating from various sources as described in the implementation models, and support is provided for an iterative approach by analysing runtime implications and highlighting problem areas.

The integrated development environment control point 710 comprises further control points which are required to provide visual modelling and development support, component assembly and testing, runtime analysis and integration with development process and lifecycle tooling.

The test tool control point 715 addresses the capabilities required of the test tools in order to support a model driven development approach, and contains further control points required to support test process automation, test case generation, test environment management, code analysis, profiling, security testing, co-existence testing and performance, load and stress testing.

The most critical control point in the enterprise development domain 315 is that of the development process and lifecycle management control point 720. It is this control point that provides consistency across linkages between the other control points and between the development domain and the other domains.

The development process and lifecycle management control point 720 contains further control points which provide focus in the following areas, namely, project and programme management, tracking, control point linkages, portfolio management and development process.

FIG. 8 shows the control points of the enterprise infrastructure management domain 320 which provides the capability to ensure that an infrastructure is put in place to deliver the necessary performance, behaviour and reliability on a variable basis that is cost-effective and can change as needed. The domain is divided into layers—the application layer 870, the IT management software layer 875, the server and storage layer 880 and the network layer 885.

The application layer 870 defines the application services control point 800 and the transaction service control point 805. The application services control point 800 is characterised by an application environment supporting a range of applications from full function web application through to function delivered as atomic components. The transaction services control point 805 is characterised by IT transaction service management, providing efficient environments for running programming languages, efficient recovery and resilience, support for very high volumes of unitary operations, de facto standards and quality of service monitoring.

The IT management software layer 875 comprises control points such as virtualisation and grid services 810, provisioning and orchestration 815, security services 820, and systems management 825.

The virtualisation and grid service control point 810 is characterised by the management of virtualized processing power, management of virtualized storage capacity, management of virtualized networks. This control point has a close link with the information and process domains as its capabilities are needed to accommodate both data and processes.

The provisioning and orchestration service control point 815 is characterised by the dynamic configuration and allocation of physical or logical IT resource units, increasing encapsulation and enactment of business policy, capture and execution of customer-defined IT best practices, end-to-end data centre automation for server, software, network, and storage resource change and configuration management The provisioning and orchestration control point 815 is closely aligned with the virtualization control point. The application of business policy in provisioning and orchestration is facilitated by virtualization. Orchestration and provisioning complements similar capabilities provided in the lower, more physical layer within some types of IT infrastructure components, for example, partitioning within a physical footprint shares or re-allocates resource within that footprint. It does so by operating across multiple physical footprints of such components, and acts in response to business policy rather than resource usage.

The security service control point 820 provides for focus for infrastructure security, intrusion or other breach detection and remedy, audit of activity.

The systems management service control point 825 provides for direct workload and job management, configuration management, problem determination and remedy, monitoring of activity and resources and metering of activity and resources.

The servers and storage layer 880 is concerned with physical hardware units. An important consideration in this layer is the distinction between channel application servers 835 and business application servers 845. The two types of servers could be considered together as a single group of servers, but it is useful to differentiate between the distributions channels (front office) and the main business engines (back office) within the financial enterprise since the former can address the demands of scale through the implementation of multiple units, while the latter are normally constrained to scale through the use of larger units. This grouping is also useful because the activities and focus of front office and back office create such large differences in workloads and qualities of service. The front office is focused on supporting the customer touch points and the interactions and flow of work that results from the interactions. The back office is all about massive and, as far as possible, automated straight through processing. So, broadly, this categorization into two elements is useful as it identifies the two significantly different groups of characteristics and needs. However, it is important to recognize that the same physical server types may support either or both elements.

The client control point 830 represents the end user computing platform itself. It is characterised by the changing workload profile (increasing browser with plug-in replacing some or all local application processing), increasingly blurred role and boundary as the logical client replaces the physical device and user interface. The client control point has a close link with both the user and the process domains as need to accommodate access by the user to applications supporting the business processes.

The channel application server control point 835 is characterised by the workload being offloaded from the client to the channel application server, further workload profile changes are occurring as more and more data flows in the channels, involving greater complexity as well as increased volume, increasing demands of supporting and servicing the channel rather than the business function. Increasing use of "user workflow", either for the allocation of work items to users or to ensure that the user adheres to a prescribed process, is also changing the role and workload, as is increased use of the Internet and internet standards.

The business application servers 845 control point meets the needs of those applications that are essentially transactional in nature and require the support of vertically scalable servers to meet very high volume workloads.

The enterprise cryptography control point 840 supports the increasing needs of financial services applications that rely on cryptographic techniques to provide the confidentiality and authentication required in the environment. For example Secure Sockets Layer (SSL) technology is a key technology for conducting secure e-commerce, and it is in use by a rapidly increasing number of applications that demand new levels of security and performance.

The network layer 885 is concerned with the communication connectivity and transport around the IT infrastructure as a whole. An important factor to consider here is network convergence, the previously separate networking behind voice, digital media transmission such as video, and the IT networks are all converging on the same network. The network layer 885 comprises a local area network control point 855, a wide area network control point 860 and a data centre network control point 865. Each network comprises its own characteristics, for example, a data centre network places much higher demands than a local area network and a wide area network on characteristics such as bandwidth capacity, latency and resilience; whereas the local and wide area networks require additional security capabilities to address the risks of external connectivity.

Moving onto FIG. 9, the transformation engine 200 is explained in use. At step 900 the transformation engine 200 receives a trigger request from the input component 205. The transformation engine 200 sends a request to the storage component 210 to obtain the idealised parameters 235, the control points 250 for each enterprise domain 230 and the input data 225.

At step 905, the rules engine 240 parses the input data in order to build a map of the current status of the enterprise's legacy infrastructure. At step 910, the rules engine 240 compares the map detailing the current status with each of the associated idealised outcome parameters 235. The idealised parameters 235 comprise parameters concerning the type of web client, hybrid client, data integration services and transaction services etc. In parallel with the comparison step (step 910), the transformation engine 200, at step 915, determines for each enterprise domain 230 the control points 250 that are relevant for the requesting enterprise. The relevant control points 250 are compared to the comparison data of step 910 and the transformation engine 200 invokes the change extraction component 215 (which in turn invokes the rules engine 240) to determine any deviations in the comparison data. The identified deviations are flagged as requiring attention by the change extraction engine 215.

The comparison data and the flagged deviations are transmitted to the output component 220 for generating a set of recommendations to the user at step 920. The set of recommendation may be categorised by enterprise domain 230 and list the technical areas that require attention in order to complete the transformation process to an on-demand operating environment. Query tools and report may be invoked to generate further statistical data, such as score cards, the progress status at a particular point in time, detailed statistical data about each enterprise domain and areas of strength and areas of weakness.

It should be appreciated that the teachings of the present invention could be offered as a business method on a subscription or fee basis. For example, a computer system comprising a transformation engine could be created, maintained and/or deployed by a service provider that offers the functions described herein for customers. That is, a service provider could offer to provide infrastructure transformation services as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The invention claimed is:

1. A system for transforming a legacy IT infrastructure including at least one of legacy IT hardware or legacy IT software into an on-demand IT infrastructure including at least one of on-demand IT hardware or on-demand IT software in a financial services enterprise, the system comprising:
   at least one computing device configured to form:
      a determiner component that determines a current status of the legacy IT infrastructure, the determiner component including a parsing component that parses at least one set of input data, that categorises the at least one set of input data into enterprise domains, and that applies a respective specific rule set to each enterprise domain;
      a comparator component that compares the determined current status to the idealised set of outcome parameters to determine a set of deviation parameters;

the determiner component determining at least one control point within the set of deviation parameters which require enterprise wide governance, each of the at least one control point including information as to what on-demand IT infrastructure capability should be included to achieve the on-demand IT infrastructure, all of the at least one control point combining to provide an on-demand operating architectural model of an on-demand operating environment that provides desired characteristics on a variable basis as requested by clients;

an enterprise infrastructure management domain that ensures the on-demand operating environment will deliver the desired characteristics on a variable basis and including at least an IT management software layer, the IT management software layer including at least a virtualisation and grid services control point; and an enterprise information domain that includes:
- a data integration services control point providing access to semantically structured data from internal and external sources, providing an integrated view of any defined entity, and providing consistent updates of information across a set of repositories under a single instruction from an application;
- a content management services control point providing for management of metadata that describes unstructured data contact including at least one of photographs, voice or video, and providing for management of storage and retrieval of content belonging to the metadata;
- an operational information repository control point storing semantically structured data including at least one of database records or metadata records, the semantically structured data required to be maintained current and being capable of retrieval and updating on an individual record basis;
- an unstructured data repository control point capturing and managing a range of data assets, the range of data assets being without an internal semantic structure;
- an analytical information repository control point storing semantically structured data that are not maintained current, the semantically structured data not maintained current representing at least one of a historical record of activity or a moment-in-time view across a number of records, the analytical information repository control point enabling analysis across a set of information that remains consistent during the analysis and being updated at regular intervals to create a new point-in-time position; and
- an analysis and modeling control point analyzing and modeling the metadata managed by the content management services control point.

2. The system as claimed in claim 1, wherein the at least one computing device is further configured to form a change extraction component for monitoring a level of adoption of the at least one control point in the on-demand operating infrastructure.

3. The system as claimed in claim 1, wherein the virtualisation and grid service control point comprises details of a set of operations to be performed that enable at least one of management of virtualised processing power, management of virtualised storage capacity, and management of virtualised networks.

4. The system as claimed in claim 1, wherein each control point details a set of operations to be performed that enable indication of aspects of on-demand IT infrastructure capability needed to achieve an on-demand infrastructure, the aspects of on-demand IT infrastructure capability including at least on-demand user IT infrastructure, on-demand process IT infrastructure, on-demand development IT infrastructure, on-demand information IT infrastructure, and on-demand management IT infrastructure.

5. The system as claimed in claim 1, further comprising an enterprise development domain that includes at least one of a business process modeling control point, a requirement/architecture/design tools control point, an integrated development environment control point, a test tools control point, and a development process/life cycle management control point.

6. The system as claimed in claim 1, wherein a control point further comprises sub control points.

7. The system as claimed in claim 1, further comprising an enterprise process domain that includes at least one of a business process services control point, an external gateway services control point, a component integration services control point, a message transformation services control point, an a discovery services control point.

8. The system as claimed in claim 1, wherein the at least one computing device is further configured to form a storing component that builds an enterprise specific taxonomy categorised by enterprise domains.

9. The system as claimed in claim 1, further comprising a user domain that includes at least one of a portal services control point, a collaboration services control point, a pervasive access services control point, a user access services control point, and a server managed client control point, the server managed client control point including at least one of a web client and a hybrid client.

10. A method for transforming a legacy IT infrastructure including at least one of legacy IT hardware or legacy IT software into an on-demand IT infrastructure including at least one of on-demand IT hardware or on-demand IT software, the method comprising:
- determining by at least one computer a current status of the legacy IT infrastructure, including, responsive to receiving at least one set of input data, parsing the at least one set of input data;
- categorising by the at least one computer the at least one set of input data into enterprise domains;
- applying by the at least one computer a respective rule set specific to a respective enterprise domain;
- comparing by the at least one computer the determined current status to an idealised set of outcome parameters to determine a set of deviation parameters;
- determining by the at least one computer at least one control point within the set of deviation parameters which require enterprise wide governance, the at least one control point including information as to what on-demand IT infrastructure capability should be included to achieve the on-demand IT infrastructure, all of the at least one control point combining to provide an on-demand operating architectural model of an on-demand operating environment that provides desired characteristics on a variable basis as requested by clients; and
- ensuring by the at least one computer and an enterprise infrastructure management domain that the on-demand operating environment will deliver the desired characteristics on a variable basis, the enterprise infrastructure management domain including at least an IT management software layer, the IT management software layer including at least a virtualisation and grid services control point, wherein the enterprise domains include an enterprise information domain that includes:
- a data integration services control point providing access to semantically structured data from internal and external sources, providing an integrated view of any defined entity, and providing consistent updates of information across a set of repositories under a single instruction from an application;
- a content management services control point providing for management of metadata that describes unstructured data contact including at least one of photographs, voice or video, and providing for management of storage and retrieval of content belonging to the metadata;
- an operational information repository control point storing semantically structured data including at least one of database records or metadata records, the semantically structured data required to be maintained current and being capable of retrieval and updating on an individual record basis;
- an unstructured data repository control point capturing and managing a range of data assets, the range of data assets being without an internal semantic structure;
- an analytical information repository control point storing semantically structured data that are not maintained current, the semantically structured data not maintained current representing at least one of a historical record of activity or a moment-in-time view across a number of records, the analytical information repository control point enabling analysis across a set of information that remains consistent during the analysis and being updated at regular intervals to create a new point-in-time position; and
- an analysis and modeling control point analyzing and modeling the metadata managed by the content management services control point.

11. A method as claimed in claim 10, further comprising monitoring by the at least one computer the level of adoption of the at least one control point in the on-demand operating infrastructure.

12. A method as claimed in claim 10, wherein the virtualisation and grid service control point further comprises details of a set of operations to be performed that enable at least one of management of virtualised processing power, management of virtualised storage capacity, and management of virtualised networks.

13. A method as claimed in claim 10, wherein each control point details a set of operations to be performed that enable indication of aspects of on-demand IT infrastructure capability needed to achieve an on-demand infrastructure, the aspects of on-demand IT infrastructure capability including at least on-demand user IT infrastructure, on-demand process IT infrastructure, on-demand development IT infrastructure, on-demand information IT infrastructure, and on-demand management IT infrastructure.

14. A method as claimed in claim 10, wherein the enterprise domains include an enterprise development domain that includes at least one of a business process modeling control point, a requirement/architecture/design tools control point, an integrated development environment control point, a test tools control point, and a development process/life cycle management control point.

15. A method as claimed in claim 10, wherein a control point further comprises sub control points.

16. A method as claimed in claim 10, wherein the enterprise domains include an enterprise process domain that includes at least one of a business process services control point, an external gateway services control point, a component integration services control point, a message transformation services control point, an discovery services control point.

17. A method as claimed in claim 10, further comprising building by the at least one computer an enterprise specific taxonomy categorised by enterprise domains.

18. A method as claimed in claim 10, wherein the enterprise domains include a user domain that includes at least one of a portal services control point, a collaboration services control point, a pervasive access services control point, a user access services control point, and a server managed client control point, the server managed client control point including at least one of a web client and a hybrid client.

19. A computer program product including instructions in the form of computer executable code stored on a non-transitory computer readable storage medium and loadable into the internal memory of a digital computer configured for performing, when said product is run on a computer, a process of transforming a legacy IT infrastructure including at least one of legacy IT hardware or legacy IT software into an on-demand IT infrastructure including at least one of on-demand IT hardware or on-demand IT software, the computer program product comprising:
- program code configured for determining a current status of the legacy IT infrastructure, including parsing at least one set of input data, categorising the at least one set of input data into enterprise domains, and applying a specific rule set to a respective enterprise domain;
- program code configured for comparing the determined current status to an idealised set of outcome parameters to determine a set of deviation parameters;
- program code configured for determining at least one control point within the set of deviation parameters which require enterprise wide governance, the at least one control point including information as to what on-demand IT infrastructure capability should be included to achieve the on-demand IT infrastructure, all of the at least one control point combining to provide an on-demand operating architectural model of an on-demand operating environment that provides desired characteristics on a variable basis as requested by clients; and
- program code configured for ensuring, with an enterprise infrastructure management domain, that the on-demand operating environment will deliver the desired characteristics on a variable basis, the enterprise infrastructure management domain including at least an IT management software layer, the IT management software layer including at least a virtualisation and grid services control point, wherein the enterprise domains include an enterprise information domain that includes:
- a data integration services control point providing access to semantically structured data from internal and external sources, providing an integrated view of any defined entity, and providing consistent updates of information across a set of repositories under a single instruction from an application;
- a content management services control point providing for management of metadata that describes unstructured data contact including at least one of photographs, voice or video, and providing for management of storage and retrieval of content belonging to the metadata;

an operational information repository control point storing semantically structured data including at least one of database records or metadata records, the semantically structured data required to be maintained current and being capable of retrieval and updating on an individual record basis;

an unstructured data repository control point capturing and managing a range of data assets, the range of data assets being without an internal semantic structure;

an analytical information repository control point storing semantically structured data that are not maintained current, the semantically structured data not maintained current representing at least one of a historical record of activity or a moment-in-time view across a number of records, the analytical information repository control point enabling analysis across a set of information that remains consistent during the analysis and being updated at regular intervals to create a new point-in-time position; and an analysis and modeling control point analyzing and modeling the metadata managed by the content management services control point.

20. A computer program product as claimed in claim 19, further comprising program code configured for forming a monitoring component that monitors a level of adoption of the at least one control point in the on-demand operating infrastructure.

21. A computer program product as claimed in claim 19, wherein the virtualisation and grid service control point further comprises details of a set of operations to be performed that enable at least one of management of virtualised processing power, management of virtualised storage capacity, and management of virtualised networks.

22. A computer program product as claimed in claim 19, wherein each control point details a set of operations to be performed that enable indication of aspects of on-demand IT infrastructure capability needed to achieve an on-demand infrastructure, the aspects of on-demand IT infrastructure capability including at least on-demand user IT infrastructure, on-demand process IT infrastructure, on-demand development IT infrastructure, on-demand information IT infrastructure, and on-demand management IT infrastructure.

23. A computer program product as claimed in claim 19, wherein the enterprise domains include an enterprise development domain that includes at least one of a business process modeling control point, a requirement/architecture/design tools control point, an integrated development environment control point, a test tools control point, and a development process/life cycle management control point.

24. A computer program product as claimed in claim 19, wherein a control point further comprises sub control points.

25. A computer program product as claimed in claim 19, wherein the enterprise domains include an enterprise process domain that includes at least one of a business process services control point, an external gateway services control point, a component integration services control point, a message transformation services control point, an a discovery services-control point.

26. A computer program product as claimed in claim 19, further comprising program code configured for building an enterprise specific taxonomy categorised by enterprise domains.

27. A computer program product as claimed in claim 19, wherein the enterprise domains include a user domain that includes at least one of a portal services control point, a collaboration services control point, a pervasive access services control point, a user access services control point, and a server managed client control point, the server managed client control point including at least one of a web client and a hybrid client.

* * * * *